Patented Apr. 21, 1931

1,801,887

UNITED STATES PATENT OFFICE

CHARLES J. STROSACKER, OF MIDLAND, MICHIGAN, ASSIGNOR TO THE DOW CHEMICAL COMPANY, OF MIDLAND, MICHIGAN, A CORPORATION OF MICHIGAN

MANUFACTURE OF CHLOROFORM

No Drawing. Original application filed December 9, 1924, Serial No. 754,858. Divided and this application filed June 27, 1928. Serial No. 288,807.

The present improvements relating, as indicated, to the manufacture of chloroform have more particular regard to a method whereby such chloroform may be made from trichlor-acetic acid ($CCl_3.CO_2H$). While the theoretical possibility of such method of preparation may have received consideration, I am not aware that such method has ever been found feasible for use in the commercial production of chloroform.

The object of the present invention accordingly is to provide a relatively simple and direct method for making chloroform wherein acetic acid and chlorine, both of which are readily available, may be utilized as the basic ingredients in the process, viz., to make trichlor-acetic acid, and the latter may then be converted simply and directly into the desired final product. To the accomplishment of the foregoing and related ends, the invention, then, consists of the steps hereinafter fully described and particularly pointed out in the claims, the following description setting forth but several of the various ways in which the principle of the invention may be used.

While trichlor-acetic acid may be variously prepared, I preferably make such acid by direct chlorination of acetic acid, this method of preparation constituting a separate invention described and claimed in my pending application filed Dec. 9, 1924, Ser. #754,858 now Patent No. 1,757,100, out of which the present application has been required to be divided. It is known that monochlor-acetic acid may be prepared thus by directly chlorinating acetic acid. I have discovered that by conducting such chlorination in the presence of a catalyst such as acetic anhydride, sulphur, sulphur chloride, or phosphorus, and by continuing such chlorination at a somewhat higher temperature, the dichlor-compound is obtained, and upon still further continuing the chlorination with catalyst present at an elevated temperature, the trichlor-compound is obtained. The latter has a melting point (approximately 52° C.) higher than normal room temperature and so will solidify if allowed to cool to such temperature.

According to my present improved method of making chloroform, I then take such trichlor-acetic acid while sufficiently hot to be fluid and pump same into a body of milk of lime, or equivalent hydroxide compound. Provision is made for radiating or conducting heat away from such body so as to keep its temperature down to approximately room temperature, despite the introduction of the hot trichlor-acetic acid. The lime should be present in excess, the result of the reaction being the formation of the calcium salt of trichlor-acetic acid as indicated by the following equation, viz:—

(1). 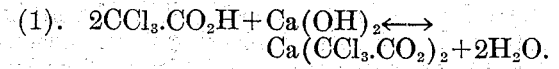
$$2CCl_3.CO_2H + Ca(OH)_2 \leftrightarrows Ca(CCl_3.CO_2)_2 + 2H_2O.$$

After a sufficient quantity of such calcium salt has accumulated, such salt being in suspension in the watery vehicle that formed the suspension medium for the milk of lime, the resulting mixture is heated to a point of decomposition of such salt with the formation of chloroform, as indicated by the following equation, viz:—

(2). 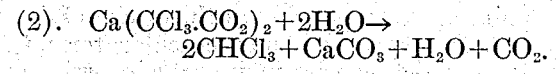
$$Ca(CCl_3.CO_2)_2 + 2H_2O \rightarrow 2CHCl_3 + CaCO_3 + H_2O + CO_2.$$

Since no stage-wise purifications are necessary in this process, it will be seen thus that partially chlorinated acetic acid, as for instance dichloracetic acid available sometimes as a by-product in a process primarily designed for the preparation of monochloracetic acid, can be conveniently worked up with the further chlorination as described and direct alkalination and splitting to produce chloroform.

The temperature in the final chlorination stage will run up from 150° to 160° C. and such chlorination is carried to the point where from 85 to 90 per cent. of trichlor-acetic acid is formed. I have found that if it be attempted to add more chlorine decomposition will occur. The decomposition of the calcium salt of trichlor-acetic acid into chloroform may be accomplished at a temperature of from 50° to 60° C., following which the chloroform is distilled off in the usual manner.

In place of adding the trichlor-acetic acid to milk of lime in the foregoing steps of the process, I may add it to a water mixture or solution of other hydroxides, for example, the hydroxide of an alkali or alkaline earth metal, or of magnesium; or the carbonate of any such metal may be substituted. In fact, the reactions set forth in Equations (1) and (2) above may be combined, eliminating the intermediary of any metal hydroxide and directly splitting off carbon dioxide, by similarly heating the trichlor-acetic acid with the hydroxyl component, i. e. with water, alone, in accordance with the following equation, viz:—

(3). 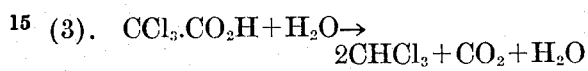
$$CCl_3.CO_2H + H_2O \rightarrow 2CHCl_3 + CO_2 + H_2O$$

This last mentioned reaction, however, proceeds too slowly to present any practical value, as at present advised.

Other modes of applying the principle of my invention may be employed instead of the one explained, change being made as regards the method herein disclosed, provided the step or steps stated by any of the following claims or the equivalent of such stated step or steps be employed.

I therefore particularly point out and distinctly claim as my invention:

1. In a method of making chloroform, the steps which consist in reacting in an aqueous medium trichlor-acetic acid with calcium hydroxide, and then heating the resultant solution or suspension to the point of decomposition of the calcium salt.

2. In a method of making chloroform, the steps which consist in reacting in an aqueous medium trichlor-acetic acid with calcium hydroxide suspended in water, and then heating the resultant solution or suspension to the point of decomposition of the calcium salt.

3. In a method of making chloroform, the steps which consist in introducing trichlor-acetic acid into a suspension of calcium hydroxide in water, whereby the calcium salt of such acid is formed, cooling the suspension during such introduction of the acid, then heating the mixture at a temperature between about 50° to 60° C. and distilling off the chloroform produced thereby.

Signed this 22nd day of June, 1928.

CHARLES J. STROSACKER.